United States Patent
Raassina et al.

(10) Patent No.: US 10,574,166 B2
(45) Date of Patent: Feb. 25, 2020

(54) ELECTRIC LINEAR MOTOR FOR AN ELEVATOR AND METHOD FOR CONTROLLING THEREOF

(71) Applicant: KONE Corporation, Helsinki (FI)

(72) Inventors: Pasi Raassina, Helsinki (FI); Seppo Suur-Askola, Helsinki (FI); Jussi Lähteenmäki, Helsinki (FI); Marko Minkkinen, Helsinki (FI); Tuukka Korhonen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 15/900,494

(22) Filed: Feb. 20, 2018

(65) Prior Publication Data

US 2018/0262146 A1    Sep. 13, 2018

(30) Foreign Application Priority Data

Mar. 9, 2017    (EP) .................................... 17160022

(51) Int. Cl.
*H02K 41/00*    (2006.01)
*H02P 1/00*    (2006.01)
(Continued)

(52) U.S. Cl.
CPC .............. *H02P 25/064* (2016.02); *B66B 1/30* (2013.01); *B66B 7/044* (2013.01);
(Continued)

(58) Field of Classification Search
CPC ........ H02P 25/064; H02K 11/21; H02K 11/33
(Continued)

(56) References Cited

U.S. PATENT DOCUMENTS

| | | | | |
|---|---|---|---|---|
| 5,501,300 A | * | 3/1996 | Cho ................... | B66B 11/0407 187/289 |
| 2004/0217657 A1 | * | 11/2004 | Potter ..................... | H02K 5/04 310/12.18 |

(Continued)

FOREIGN PATENT DOCUMENTS

| EP | 2 131 477 A2 | 12/2009 |
|---|---|---|
| EP | 2 131 477 A3 | 12/2013 |

(Continued)

OTHER PUBLICATIONS

Deok-Je Bang et al., "Wide Air-gap Control for Multi-module Permanent Magnet Linear Synchronous Motors without Magnetic Levitation Windings," Journal of Power Electronics, vol. 16, No. 5, Sep. 20, 2016, pp. 1773-1780, XP055640187.

(Continued)

*Primary Examiner* — Erick D Glass
(74) *Attorney, Agent, or Firm* — Birch, Stewart, Kolasch & Birch, LLP

(57) ABSTRACT

An electric linear motor for an elevator and a method for controlling the operation thereof are presented. The electric linear motor comprises at least one stator beam and at least one mover, wherein said at least one stator beam comprises at least two stators on opposite sides of the stator beam, and the at least one mover is in electromagnetic engagement with said at least two stators and configured to be moved relative to said stator beam. Said at least one mover comprises at least two units of electromagnetic components arranged on opposite sides of the stator beam to face said at least two stators for controlling the movement and the position of the mover with respect to said stator beam.

18 Claims, 5 Drawing Sheets

(51) Int. Cl.
  *H02P 3/00* (2006.01)
  *H02P 5/00* (2016.01)
  *H02P 25/064* (2016.01)
  *B66B 11/04* (2006.01)
  *H02K 41/03* (2006.01)
  *B66B 7/04* (2006.01)
  *H02K 11/21* (2016.01)
  *H02K 11/33* (2016.01)
  *B66B 1/30* (2006.01)

(52) U.S. Cl.
  CPC .......... *B66B 11/0407* (2013.01); *H02K 11/21* (2016.01); *H02K 11/33* (2016.01); *H02K 41/033* (2013.01)

(58) Field of Classification Search
  USPC ........................................................ 318/135
  See application file for complete search history.

(56) References Cited

U.S. PATENT DOCUMENTS

2016/0083226 A1\* 3/2016 Piech .................. B66B 11/0407
                                                                187/250
2017/0057791 A1\* 3/2017 Hsu .......................... B66B 7/00

FOREIGN PATENT DOCUMENTS

EP            3 115 330 A1    1/2017
WO    WO 2016/206757 A1   12/2016

OTHER PUBLICATIONS

Office Action issued in corresponding European Application No. 17160022.4 dated Nov. 4, 2019.

\* cited by examiner

ELECTRIC LINEAR MOTOR FOR AN ELEVATOR AND METHOD FOR CONTROLLING THEREOF

TECHNICAL FIELD

The invention concerns in general the technical field of elevators. The invention concerns especially, however, not exclusively, controlling the operation of a linear electric motor of an elevator.

BACKGROUND

In some elevators, a linear electric motor is utilized for moving the elevator car between landing floors. Linear electric motors are especially useful for elevators having very long elevator shafts, that is, so called high-rise elevators. The problem with high-rise elevators is that the weight of the hoist rope becomes so high that the rope may not withstand its own weight, let alone the weight of the elevator car.

A typical electric linear motor is such that it has a long linear stator equipped with controllable electromagnetic components such as coils for generating magnetic field. The rotor, or "mover", typically comprises permanent magnets, magnetic fields of which, when being in electromagnetic engagement with the "traveling" magnetic field of the stator, causes the rotor to move along the linear stator.

In some earlier attempts, the linear electric motors have been advantageously utilized in elevators as described hereinabove. In some solutions, the windings have been arranged to the linear stator which, especially in high-rise elevators, requires considerable amount of windings to be winded since the length of the linear stator can be from 50 meters up to hundreds of meters, for instance.

In an earlier attempted solution, an electric linear motor having permanent magnets and controllable electromagnetic components, such as windings, arranged to the mover which is mounted to the elevator car. The linear stator, in contrary, comprises ferromagnetic material and is shaped to have stator teeth. Thus, the teeth arranged sequentially to the linear stator form magnetic poles when being in electromagnetic engagement with the mover generating magnetic field via controllable windings and permanent magnets. This arrangement is advantageous because the windings are arranged to the mover or movers instead of long linear stator or stators, thus saving winding material.

A challenge with the earlier attempts is that although the mover, and thus the elevator car alongside with the mover, can be moved along the linear stator by known methods utilizing varying magnetic field generated by motor the motor current, the elevator typically needs additional windings for levitating the mover, that is, to maintain an air gap or air gaps between the mover and the stator. Another challenge is that the mover tends to tilt with respect to the linear stator, that is, to turn in clockwise or counter-clockwise direction. The tilting may be felt by passengers inside the elevator car as uncomfortable vibrations.

There is thus still a need to provide a simple electric linear motor capable of controlling the levitation and the tilting of the mover of the electrical linear motor.

SUMMARY

An objective of the present invention is to provide an electric linear motor, a method, a computer program product, an elevator control unit and an elevator for controlling operation of the electric linear motor of the elevator. Another objective of the present invention is that the electric linear motor, the method, the computer program product, the elevator control unit and the elevator for controlling operation of the electric linear motor of the elevator enables controlling the position of the mover with respect to the stator beam of the electric linear motor.

The objectives of the present invention are reached by the electric linear motor, the method, the computer program product, the elevator control unit and the elevator for controlling operation of the electric linear motor of the elevator as defined by the respective independent claims.

According to a first aspect, an electric linear motor for an elevator is provided. The electric linear motor comprises at least one stator beam and at least one mover. The at least one stator beam comprises at least two stators on opposite sides of the stator beam. The at least one mover is in electromagnetic engagement with said at least two stators and configured to be moved relative to said stator beam. Furthermore, the at least one mover comprises at least two units of electromagnetic components, such as windings and, optionally, permanent magnets and/or irons, arranged on opposite sides of the stator beam to face said at least two stators for controlling the movement and the lateral position, such as with respect to levitation and/or tilting, of the mover with respect to said stator beam.

The unit of electromagnetic components may refer to at least two controllable windings for generating magnetic fields. However, the unit may comprise any number of windings. In addition, the unit may comprise elements such as permanent magnets and/or irons. The moving of the mover relative to the stator beam may preferably be controlled by the windings of the units of electromagnetic components.

The two units of electromagnetic components may advantageously be simultaneously utilized for controlling the movement of the mover along the stator mean and the lateral position of the mover with respect to the stator beam, for example, concerning air gap regulation in connection with levitation and/or tilting of the mover with respect to the stator beam. Thus, there may not be additional windings neither for controlling the levitation nor the tilting. However, according to some embodiments, there may be additional windings for controlling either the levitation or the tilting, whereas the moving along the stator beam and either the levitation or the tilting may be controlled simultaneously by the at least two electromagnetic components.

Each of the at least two units of electromagnetic components may comprise at least two windings for generating magnetic fields. Each winding may have at least two, preferably three, phases and each phase of the windings may have one or more coils.

The at least two windings may preferably be displaced with respect to each other in the direction defined by the stator beam, that is, the longitudinal direction, for controlling tilting of the mover with respect to the stator beam. In case one phase of the winding comprises two or more coils, said two or more coils of the same winding phase may be divided to opposite sides of the stator beam and displaced with respect to each other in the direction defined by the stator beam for controlling tilting of the mover.

The at least two units of electromagnetic components may be connected electrically in series or in parallel with respect to each other.

Each one of the at least two units of electromagnetic components, or even the individual windings or winding phases, or one or at least some of the individual coils of the at least two units, may be independently controllable by electrical drives.

At least one of the at least two units of electromagnetic components may be coupled to an H-bridge inverter.

The electric linear motor may comprise at least four units of electromagnetic components arranged such that two of the at least four units are arranged on opposite side of the stator beam with respect to other two of the at least four units to face said at least two stators for controlling the movement along the stator beam as well as the lateral position, for example levitation and/or tilting, of the mover with respect to said stator beam. When having four units of electromagnetic components arranged as described above, it provides the advantage of being able to control the tilting of the mover relative to both directions: clockwise and counter-clockwise.

The four units may be independently controllable by designated electrical drives, or alternatively, two of the units may be electrically interconnected, that is, the units may be operated as pairs. Preferably, two units on opposite sides and displaced with respect to the direction of the stator beam form one pair, and the other two another pair.

According to a second aspect, a method for controlling operation of an electric linear motor is provided. The electric linear motor comprises at least one stator beam and at least one mover. The at least one stator beam comprises at least two stators on opposite sides of the stator beam. The at least one mover is in electromagnetic engagement with said at least two stators and configured to be moved relative to said stator beam. The method comprises determining a magnitude of air gap between the mover and the at least one stator beam, and controlling said magnitude of air gap by at least two units of electromagnetic components arranged on opposite sides of the stator beam to face the at least two stators so as to control lateral position, such as levitation and/or tilting, of the mover with respect to the at least one stator beam.

The determining of the magnitude may comprise determining magnitudes of air gaps between the mover and the at least one stator beam at least at two locations.

Each one of said two locations may preferably be on opposite sides of the stator beam with respect to each other.

The magnitude or magnitudes of air gap or gaps, respectively, are determined in a direction parallel relative to the direction in which the units of electromagnetic components and stators are facing each other. The location at which the air gaps are located may be at corresponding positions with respect to the electromagnetic components and stators or may be adjacent with respect to said components and stators.

Said locations may be displaced in the direction defined by the stator beam for determining tilting of the mover with respect to the at least one stator beam.

The controlling of the magnitude or magnitudes of said air gap or gaps, respectively, may be performed by controlling the current of said units of electromagnetic components.

The at least two units of electromagnetic components may be displaced in the direction defined by the stator beam. The controlling of said magnitudes of air gaps may then comprise controlling the current of said units of electromagnetic components for controlling tilting of the mover with respect to the stator beam.

The electric linear motor may be a three-phase electric motor. The method may then comprise determining a direct component of motor current, and the controlling of the magnitudes of air gap or gaps may comprise controlling the direct component of motor current.

The determining of the magnitude of air gap may be performed by utilizing an inductive proximity sensor or an array type of proximity sensor. In case of a plurality of air gaps, the determining of the magnitudes of air gaps may be performed by utilizing inductive proximity sensors or array types of proximity sensor or only one array type of proximity sensor.

According to a third aspect, an elevator control unit for controlling operation of an electric linear motor of an elevator is provided. The elevator control unit comprises at least one processor, and at least one memory storing at least one portion of computer program code, wherein the at least one processor being configured to cause the elevator control unit at least to perform:

determine a magnitude of air gap between the mover and the at least one stator beam, and control said magnitude of air gap by at least two units of electromagnetic components facing the at least two stators, preferably, for controlling the lateral position of the mover, such as with respect to levitation and/or tilting, with respect to the at least one stator beam.

According to a fourth aspect, a computer program product for controlling operation of an electric linear motor is provided. The computer program product comprises program instructions which when executed by an elevator control unit cause the elevator control unit to perform the method according to the second aspect.

According to a fifth aspect, an elevator for controlling operation of an electric linear motor of the elevator is provided. The elevator comprises an electric linear motor, which comprises at least one stator beam and at least one mover. The at least one stator beam comprises at least two stators on opposite sides of the stator beam, and the at least one mover is in electromagnetic engagement with said at least two stators and configured to be moved relative to said stator beam. The elevator further comprises determining means for determining magnitudes of air gaps between the mover and the stator beam, and an elevator control unit configured to at least:

determine a magnitude of air gap between the mover and the at least one stator beam, and control said magnitude of air gap by at least two units of electromagnetic components facing the at least two stators, preferably, for controlling the lateral position, such as with respect to levitation and/or tilting, of the mover with respect to the at least one stator beam.

The elevator control unit, the determining means and the electric linear motor and/or the electrical drive utilized for controlling the motor or units of electromagnetic components are communicatively coupled to each other.

The present invention provides an electric linear motor and a method for controlling the electric linear motor. The method provides advantages over known solutions such that the levitation and/or the tilting of the mover can be controlled by the same electromagnetic components which are utilized for moving the mover along the stator beam. Depending on the particular embodiment of the present invention, there may not be a need to use additional windings for controlling either the levitation or the tilting.

Various other advantages will become clear to a skilled person based on the following detailed description.

The expression "a plurality of" refers herein to any positive integer starting from two, e.g. to two, three, or four.

The terms "first", "second", "third", "fourth" and "fifth" do not denote any order, quantity, or importance, but rather are used to distinguish one element from another.

The exemplary embodiments of the present invention presented herein are not to be interpreted to pose limitations to the applicability of the appended claims. The verb "to comprise" is used herein as an open limitation that does not exclude the existence of also un-recited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the present invention are illustrated by way of example, and not by way of limitation, in the figures of the accompanying drawings.

DESCRIPTION OF SOME EMBODIMENTS

Figure 1:
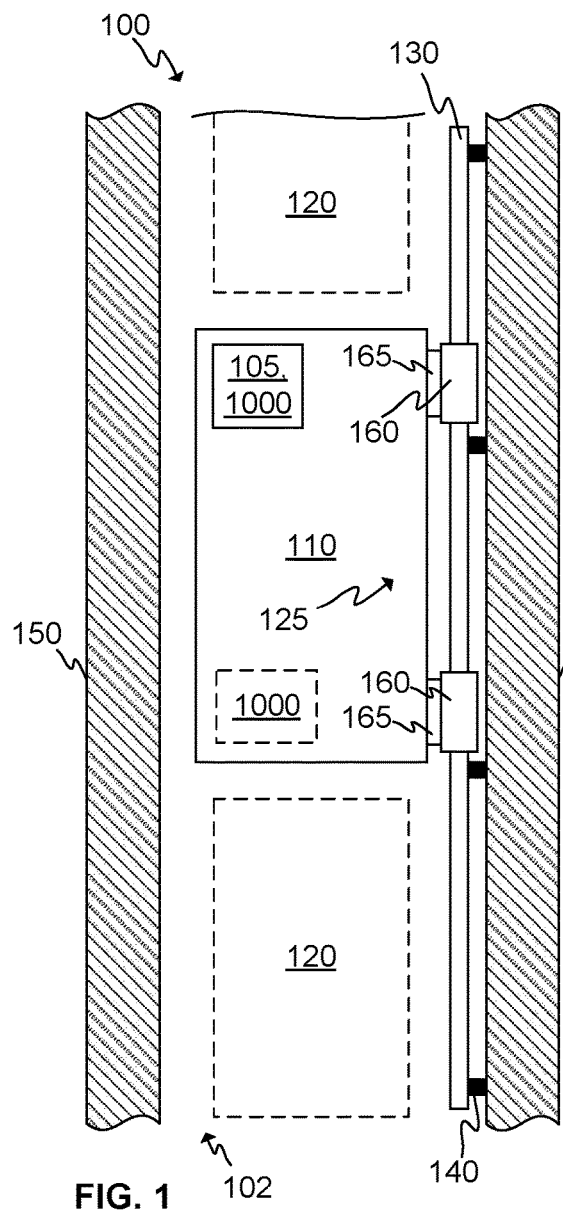
FIG. 1 illustrates schematically an elevator according to an embodiment of the present invention.

FIG. 1 illustrates schematically an elevator 100 according to an embodiment of the present invention from a cross-sectional side view. The elevator 100 may comprise an elevator shaft 102 and an electric linear motor 125 mounted on the elevator car 110 and for moving the elevator car 110 comprised in the elevator 100. The elevator 100 may comprise, preferably, at least two landing floors comprising landing doors 120 and/or openings 120.

The elevator car 110 may preferably be designed to serve the landing floors during normal operation of the elevator 100. The moving of the elevator car 110 may normally be upwards or/and downwards. However, the electric linear motor 125 may also be arranged to move the elevator car 110 in horizontal directions or in any other directions, for example. This may be achieved by arranging a stator beam 130 or beams 130 to align relative to the desired direction.

The stator beam 130 or beams 130 may preferably be arranged fixed with respect to the environment, that is, with respect to the elevator shaft 102 in FIG. 1. The stator beam 130 or beams 130 may be mounted to a wall 150 or walls 150 of the elevator shaft 102 by fastening element(s) 140.

The elevator car 110 may be mechanically mounted to a mover 160 or movers 160 of the linear electric motor 125 directly or, for example, by at least via one mover support member 165. As can be seen in FIG. 1, there may be two movers 160 arranged to be moved, and thus also move the elevator car 110, along one stator beam 130, that is, in the longitudinal direction of the stator beam 130. However, there may be one mover 160 or more than two movers 160 arranged to be moved along one stator beam 130. One or two or more of them may be mechanically coupled to one elevator car 110. There may also be one or a plurality of stator beams 130, preferably, arranged stationary with respect to the environment, that is, in this case the elevator shaft 102, in which the electric linear motor 125 is intended to operate.

Figure 2:
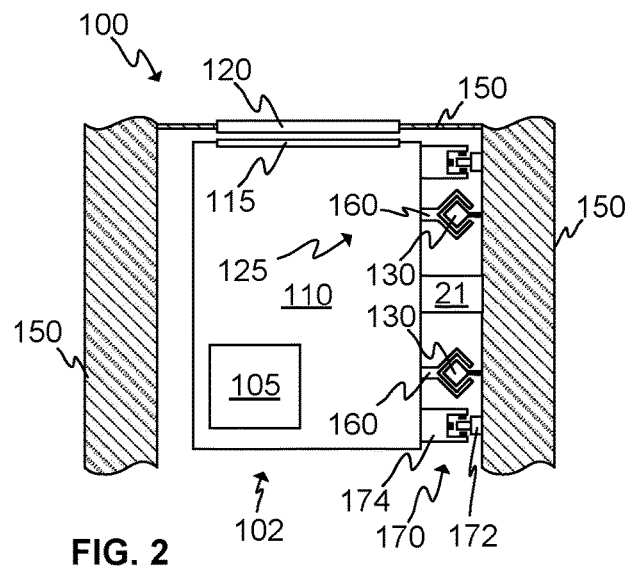
FIG. 2 illustrates schematically an elevator according to an embodiment of the present invention.

FIG. 2 illustrates an embodiment comprising two stator beams 130, advantageously, arranged parallel to each other, however, it is clear that there could be three or four or even more stator beams 130. The same applies to the number of movers 160 configured to be moved relative to one stator beam 130 as described hereinabove.

The operation of the linear electric motor 125 may be controlled by an electrical drive 105 or a plurality of electrical drives 105A, 105B, such as a frequency converter or converters or an inverter or inverters. There may be a separate elevator control unit 1000 or it may be comprised in the electrical drive 105. There may be one electrical drive 105 for controlling one mover or several drives 105A, 105B controlling one mover depending on the structure and configuration of the mover in question, that is, a mover comprising one or several controllable electromagnetic components such as windings.

Although it is preferred that the stator beams 130 and movers 160 of the elevator 100 of FIG. 1 also form an electro-magnetic guide for the elevator car 110 so that any guides 170, such as guide rollers 174 and guide rails 172 may be omitted, FIG. 2 shows that in an embodiment optional car guides 174 of the elevator car 110 co-acting with optional guide rails 172 running vertically along the shaft wall 150 of FIG. 1 may be used. The shaft wall 150 comprises two parallel guide rails 172 co-acting with corresponding car guides rollers 174. Each car guide 170 has a set of guide rollers 174 co-acting with the car guide rails 172. As these car guides 170 are configured for a rucksack type suspension, the corresponding guide system is configured to keep the car 110 horizontally in connection with the shaft wall 150 as these both car guide rails 172 are the only guide rails of the elevator car 110 in the shaft 102. Various embodiments of the stator beams 130 as well as the movers 160 of the elevator car 110 are shown in more detail in FIGS. 3-6. Generally, guide rails 172 with a round cross-section may be used which are surrounded by rollers 174 of the car guide 170, thereby fixing the car horizontally in connection with the guide rail.

Furthermore, the shaft wall 102 may comprise electrical power means for providing electrical power 21 to the elevator car 110. A bus bar with vertically running connector rails from which connector rails may be connected to three phases of an AC (alternating current) mains network and one of the vertical connector rails may be a control connector connecting the elevator car 110 with the elevator control unit 1000. The elevator car may comprise a contactor which may be pressed via a telescopic spring support against the elevator car 110. Via the contactor, the elevator car 110 is provided with electric power for the operation of the mover 160 as well as for all further car components needing electric power, as e.g. doors, input/output (I/O), lighting, etc.

Figure 3:
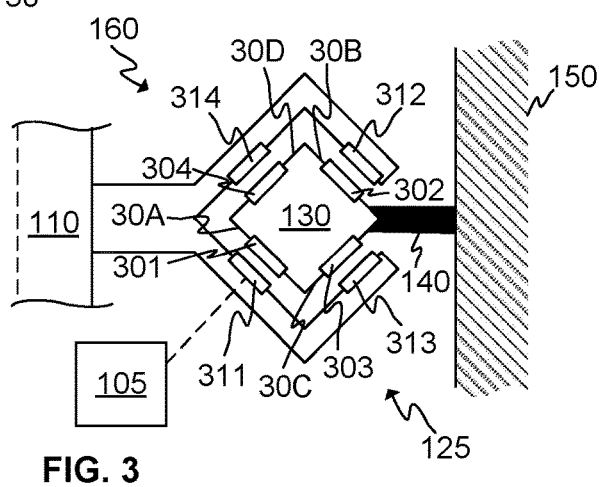
FIG. 3 illustrates schematically an electric linear motor according to an embodiment of the present invention.

The stators 301-304 may be arranged on side faces 30A-30D or sides 30A-30D of the stator beam 130 which is mounted with fastening elements 140 to a shaft wall 150 of the elevator shaft 102. FIG. 3 illustrates a stator beam 130 comprising four stators 301-304. The stators 301-304 in FIG. 3 are arranged such that two stators 301-302 or 303-304 are arranged on opposite sides of the stator beam 130. The stators 301-304 may advantageously be arranged to face (units of) the electromagnetic components 311-314 of the mover 160, respectively, in order to establish the electromagnetic engagement between the mover 160 and the stator beam 130, when the electromagnetic components 311-314 are being excited.

As shown in FIG. 1, the elevator car 110 may comprise two movers 160 which may be located one above the other, in this case both of them mounted to one elevator car 100. The lower one of the movers 160 in FIG. 1 arranged mounted to the lower half of the elevator car 110 whereas the upper mover 160 may be arranged mounted to the upper half of the elevator car 110.

FIG. 3 illustrates two movers 160 comprising electromagnetic components such as irons, preferably of ferromagnetic material, windings and permanent magnets, which may preferably be in electromagnetic engagement with stators 30A-30D located in the side faces 30A-30D of the stator beam 130. At least one or preferably at least two of the electromagnetic components 311-314 in a unit of electromagnetic components may be controllable electromagnetic component such as a winding, the current of which may be controlled in order to produce desired electromagnetic engagement with the stator beam 130. The electromagnetic engagement may refer to a force exerted by the mover 160 to the stator beam 130 for moving the mover 160 with respect to the stator beam 130. Accordingly, the elevator car 110 may be configured to travel upwards and/or downwards via corresponding control of the movers 160 in electromagnetic engagement with stator beam 130.

According to FIG. 3, the stator beam 130 may comprises a metal support structure with a square cross-section. On each side, the support structure carries a metal stator beam 130 comprising stators 301-304 forming the four side faces 30A-30D of the stator beam 130. At least the stators 301-304 are made preferably of ferromagnetic material.

According to various embodiments of the present invention, the elevator car 110 may, preferably, have a corresponding set of two movers 160 for each, typically vertical stator beams 130 so that the elevator car 110 has in total four movers, that is, two lower movers 160 and two upper movers 160 as described hereinabove.

Figure 4:
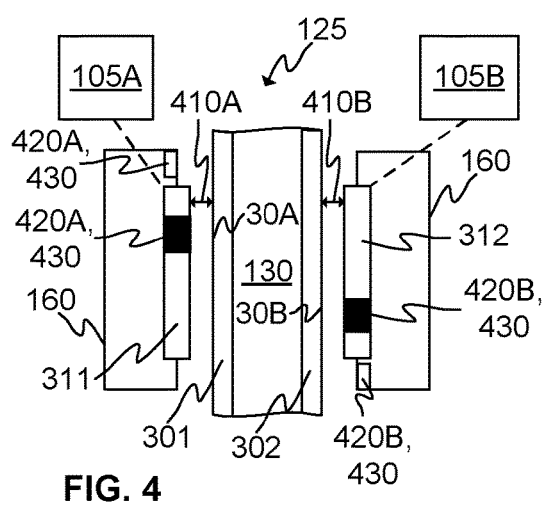
FIG. 4 illustrates schematically an electric linear motor according to an embodiment of the present invention.

FIG. 4 illustrates structure of a mover 160 from a cross-sectional side view. The units of electromagnetic components 311, 312 are arranged on opposite sides of the stator beam 130 to face the stators 301, 302, respectively. There are, advantageously, air gaps 410A, 410B, respectively, between the electromagnetic components 311, 312 of the mover 160 and the stators 301, 302. FIG. 4 further illustrates that the units of electromagnetic components 311, 312 may be controlled by separate electrical drives 105A, 105B. Furthermore, the mover 160 may advantageously comprise determining means at locations 420A, 420B for determining the magnitude of the air gap 410A, 410B. Preferably, the location 420A, 420B at which the magnitude(s) of air gap or gaps are determined, for example by proximity sensors 430, may be at the ends of the mover 160. The air gap determining means 430, such the proximity sensors 430, may then be arranged to a part or parts of the mover 160 which do not have units of electromagnetic components 311, 312. The determining means 430 at locations 420A, 420B may be, for example, an inductive proximity sensor 430 at a location 420A, 420B or an array type of proximity sensor at a location 420A, 420B. The mover 160 may comprise one or a plurality of determining means 430 at locations 420A, 420B, for example, arranged at the upper and lower part of the mover for measuring the tilting of the mover 160 with respect to the stator beam 130. In case of two movers 160, there may be only one proximity sensor 430 at a location 420A, 420B in the unit of electromagnetic components 311 arranged at the upper part of the elevator car 110 and one proximity sensor 430 at a location 420A, 420B arranged at the lower part of the elevator car 110. These sensors 430 at locations 420A, 420B arranged at different units of electromagnetic components 311, 312 may then be utilized to monitor and control the overall tilting of the elevator car 110, not merely tilting of one mover 160.

Figure 5:
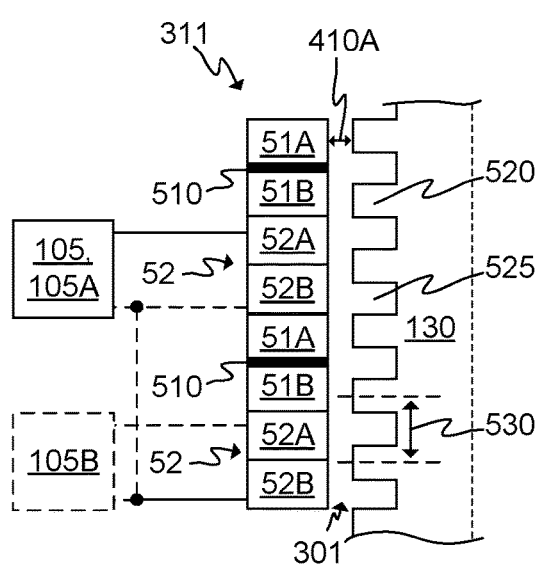
FIG. 5 illustrates schematically an electric linear motor according to an embodiment of the present invention.

FIG. 5 shows the operation principle of the flux switching linear motor formed by the movers 160 and the stators 301-304 in a stator beam 130. The stator beam 130 comprises stator teeth 520 which are spaced apart by teeth gaps 525. The electromagnetic components 311 of the mover 160 may be, for example, irons 51A, 51B, windings 52A, 52B and/or permanent magnets 510. There is advantageously an air gap 410A between the mover 160 and/or the electromagnetic components 311, and the stator 301 and/or stator beam 130 at least during the moving of the mover 160 with respect to the stator beam 130. The pitch 530 of the stator teeth 520 is identical throughout the length of the stator beam 130. The stator teeth 520 co-act in electromagnetic engagement with windings and mover irons 51A, and permanent magnets 510 located along counter-faces in the four arms of the C-type profile of the mover 160. This C-type profile of the mover surrounds the stator beam 130 but leaves an opening for the adaption of the fastening elements 140, as the mover 160 travels along the shaft 102.

Figure 6:
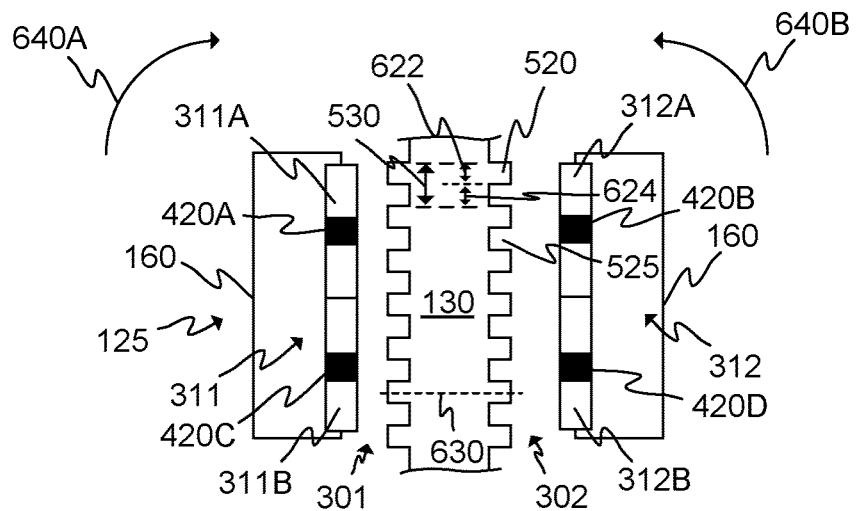
FIG. 6 illustrates schematically an electric linear motor according to an embodiment of the present invention.

FIG. 6 further illustrates the structure of the electric linear motor 125 according to an embodiment of the present invention. The stators 301, 302 in the stator beam 130 in a long vertical shaft 102 can be comprised of one single stator beam 130 with a corresponding length or by several stator beams 130 located one above each other, according to the required shaft length. In the connecting areas of stator rods arranged above each other the pitch 530 may preferable be maintained. The mover 160 may comprise on each counter-face a succession of two mover irons 51A, 51B between which one thin magnet 510 is located. Such a unit of mover irons 51A, 51B and the magnet 510 may followed by two controllable electromagnetic components 311, such as windings 52A, 52B, which are controlled as to produce a magnetic field with opposite direction. This succession 51A, 510, 51B, 52A, 52B of mover irons, permanent magnets and windings that is, the units of electromagnetic components 311A, 311B, may be repeated along to the length of the mover 160. The movement of the mover 160 with respect to the stator beam 130 is accomplished by controlling the windings 52A, 52B to switch the flux direction to the opposite so that with each switching, the mover 160 moves half of the pitch 530 of the stator teeth 520. Thus, the mover 160 can be controlled to move, for example, in upwards or downwards direction with respect to the stator beam 130. Furthermore, the mover 160 may advantageously comprise determining means at locations 420A, 420B, 420C, 420D for determining the magnitude of the air gap 410A, 410B for monitoring levitation and tilting of the mover 160.

FIG. 6 further illustrates that the stators 301, 302 on the first and second side face 30A, 30B of the stator beam 130, which are on opposite sides of the beam 130, may have an identical teeth position 630 in vertical direction. Although not shown in FIG. 6, the stators 303, 304 on the third and fourth side faces 30C, 30D of the stator beam 130 may also have the same pitch 530 but the teeth position 630 may vertically have an offset with respect to the stator teeth 520 of the stators 301, 302 on the first and second side faces 30A, 30B by, for example, a quarter of the pitch 530. The width of a tooth 622 and the width of the stator teeth gap 624 may be identical or different with respect to each other. Via this arrangement, it is ensured that on one hand, the horizontal forces between the stators on opposite sides eliminate each other whereas the vertical offset of the pitches leads to a better efficiency and a smoother run of the elevator motor, as a moving step of such a motor 125 is a half pitch 530. By the fact that four stators 301-304 are located within the stator beam 130, the force generated between the movers 160 and the stator beam 130 is multiplied by four, thereby achieving less horizontal ripples and a smoother movement of the movers 160 with respect to the vertical stator beam 130.

Figure 7A:
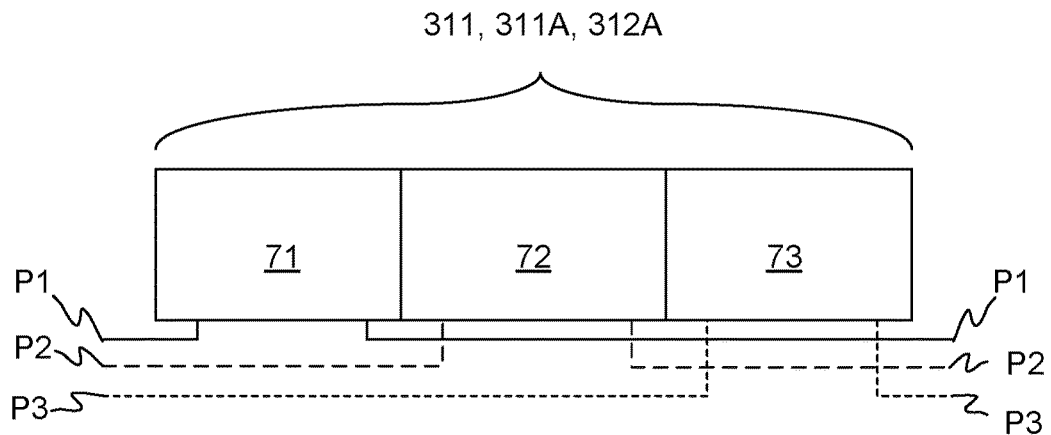
FIGS. 7A-7C illustrate schematically a unit or units of electromagnetic components according to some embodiments of the present invention.
Figure 7B:
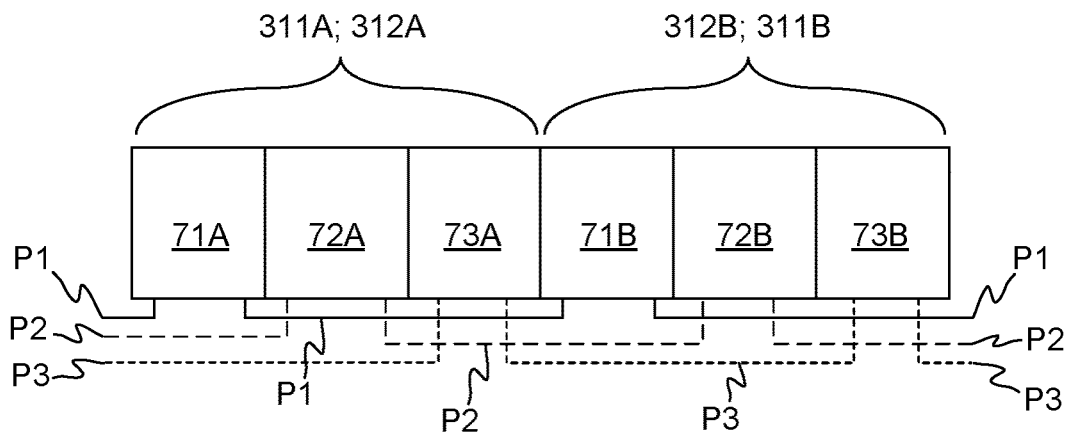

It should be noted, however, that even though the units 311, 311A, 312A, 312B, 311B and subunits 71A-73A, 71B-73B, that is, at least the windings through which currents may be injected to generate magnetic fields for moving the mover 160, are shown in FIG. 7B in sequential manner, different units may be arranged physically on opposite sides of the stator beam 130, although they would be in electrical series connection. In some embodiments, the units on opposite sides of the stator beam 130 may be vertically, that is in the longitudinal direction defined by the stator beam 130, displaced such that, for example, units 311A and 312B in FIG. 6 are arranged to be in electrical series connection with each other. The vertical displacement may be such that the units 311, 311A, 312A, 312B, 311B are partly at corresponding positions with respect to horizontal direction or may be completely displaced with respect to horizontal direction.

By having the units, such as 311A and 312B in FIG. 6, on opposite sides of the stator beam 130 provides capability to control the position of the mover 160 with respect to the stator beam 130, particularly, the tilting of the mover 160 with respect to the stator beam 130 illustrated in FIG. 6 by arrows 640A, 640B. In case of having vertically displaced units 311, 312, 311A, 312A, 312B, 311B of electromagnetic components, the torque causing tilting of the mover 160 may be controlled.

According to an embodiment of the present invention, two pairs of vertically displaced units may be arranged in to form one mover 160. This is illustrated in FIG. 6 so that units 311A and 312B form one pair of units and units 312A and 311B another pair of units. By having two pairs of units, both vertically displaced, provides capability to control the tilting of the mover in either direction: clockwise 640A or counter-clockwise 640B.

The controlling may be implemented by utilizing known methods of electrical motor control, for example, scalar or vector control based methods. It is known to a person skilled in the art to transform currents by calculation, such as utilizing an algorithm stored in a memory and executed on a computer or a processor, to transform currents from rotating frame of reference to a stationary frame of reference, and vice versa, by utilizing well-known Park and Clarke transformations. Furthermore, it is known to utilize the transformed current components, known as direct component (d-axis component) and quadrature component (q-axis component) for controlling the operation of electric motors. According various embodiments of the present invention, the frame of reference may be fixed with respect to the coordinate system of the mover 160, therefore, rotating when the mover 160 moves along the stator beam 130. This is similar to a typical situation known to a skilled person of fixing the reference frame to rotate with same speed as the rotor in a typical rotating electrical motor. The q-axis component of the input current of the electric linear motor 125 may be utilized to move the mover 160 substantially in the direction along the stator beam 130. However, a surprising effect is achieved by utilizing vertically displaced units 311, 312, 311A, 312A, 312B, 311B or subunits 71-73, 71A-73A, 71B-73B of electromagnetic components arranged on opposite sides of the stator beam 130 and preferably in addition having them vertically displaced as described hereinabove with respect to FIG. 6. The direct (d-axis) component of the motor current may, advantageously, be utilized in controlling the air gap(s) 410A, 410B between the mover 160 and the stator beam 130 and, therefore, the lateral position, such as levitation and/or tilting, of the mover 160 with respect to the stator beam 130 according to various embodiments of the present invention.

FIG. 7A illustrates an embodiment of a unit of electromagnetic components 311, 311A, 311B of the mover 160. The unit may comprise three subunits 71-73. Each subunit preferably comprises at least one controllable electromagnetic component 52A, 52B, such as windings. According to FIG. 7A, each subunit 71, 72, 73 may be provided with electrical power from different phase, namely, via first phase P1, second phase P2 and third phase P3. Each phase may be controlled by one electrical drive 105, such as a three-phase inverter, or by three electrical drives, that is, one drive per phase. The subunit 71-73 may be physically arranged in sequentially or in a row to form linear part of the mover 160 such as shown in FIG. 7A.

FIG. 7B illustrates an embodiment in which two units 311, 311A, 312A, 312B, 311B of electromagnetic components may be arranged sequentially. In this case six subunits 71A-73A, 71B-73B are arranged sequentially to form linear part of the mover 160. FIG. 7B illustrates that certain subunits 71A, 71B may be provided with electrical power from the first phase P1, certain subunits 72A, 72B may be provided with electrical power from the second phase P2, and certain subunits 73A, 73B may be provided with electrical power from the third phase P3. According to FIG. 7B, the subunits of the same phase are connected in series connection, however, they may also be connected in parallel connection. Furthermore, each subunit may be driven by a single electrical drive, or each phase may be provided with electrical power by one electrical drive, or there may be three-phase electrical drives utilized to provide electrical power for units of electromagnetic components 311, 311A, 311B of the mover 160, as described hereinabove with respect to FIG. 7A.

Figure 7C:
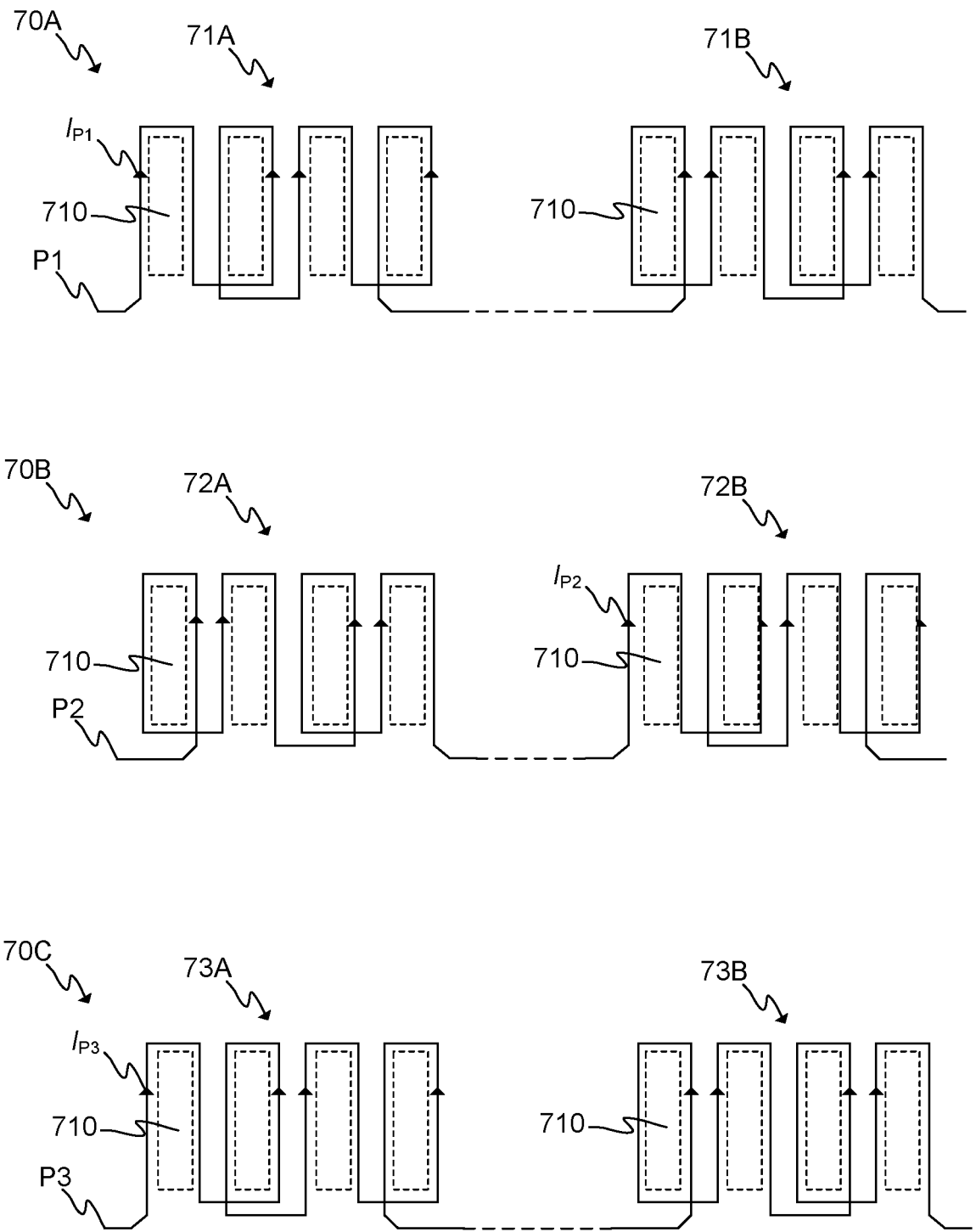

FIG. 7C illustrates at 70A-70C schematically subunits 71A-73A, 71B-73B, in this case, windings of the mover 160 according to an embodiment of the present invention. Each subunit 71A-73A, 71B-73B comprises four teeth which through which the magnetic flux may be arranged to be directed by exciting the windings by injecting current through the windings. However, there may also be only one tooth or two teeth or even more than four teeth. As can be seen, the windings are arranged such that the current, for example, the current $1_{P1}$ produces a magnetic flux in opposite direction with respect to the previous teeth within one subunit. The subunits may physically be arranged such as in FIG. 7B, that is, in sequential manner. Every third subunit is thus provided electrical power form the same phase, such as, in case of subunits 71A and 71B from phase P1 and by current $1_{P1}$, in case of subunits 72A and 72B from phase P2 and by current $1_{P2}$, and in case of subunits 73A and 73B from phase P3 and by current $1_{P3}$. However, although connected electrically in series, the subunits form a pair, such as subunits 71A and 71B or the other two subunits, may also be advantageously be arranged on opposite sides of the stator beam 130 for providing capability to control the tilting of the mover 160 with respect to the stator beam 130.

According to an embodiment of the present invention, the mover 160 may have two separate three-phase windings arranged sequentially, that is one after another, in the direction of the stator beam 130. Both windings may be controlled or operated by separate electrical drives 105A, 105B, such as three-phase inverters. Both electrical drives 105A, 105B may control or regulate independently d-axis components of the currents in the windings for controlling the lateral position, especially the tilting, of the mover 160. The electrical drives 105A, 105B may simultaneously be controlled in common manner so as to control or regulate q-axis currents for controlling the position, speed and/or acceleration of the mover 160 in the direction of the stator beam 130.

Figure 8:
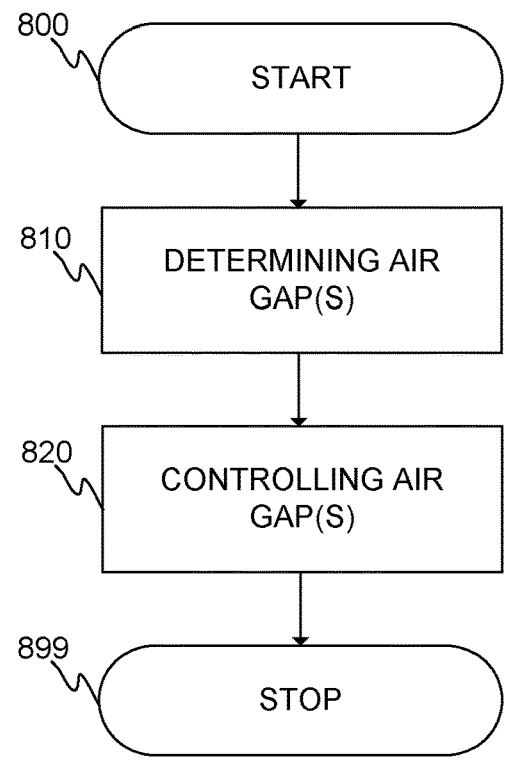
FIG. 8 illustrates a flow diagram of the method according to an embodiment of the present invention.

FIG. 8 illustrates a flow diagram of the method according to an embodiment of the present invention.

At 800, referring to a start-up phase, the necessary tasks such as obtaining components and systems, and calibration and other configuration may take place. Specific care must be taken that the individual elements and material selections work together. Communication and electrical connections between various components and (sub-)systems may be established.

At 810, determining a magnitude of air gap 410A, 410B between the mover 160 and the at least one stator beam 130 may take place. The magnitude may be determined at one, two or several locations between the mover 160 and the stator beam 130. Preferably, the magnitude or magnitudes of air gap or gaps 410A, 410B may be determined in a direction parallel relative to the direction in which the units of electromagnetic components 311, 311A, 311B, 312, 312A, 312B, 313, 314 and stators 301, 302; 303, 304 are facing each other.

At 820, controlling said magnitude of air gap 410A, 410B by at least two units of electromagnetic components 311, 311A, 311B, 312, 312A, 312B, 313, 314 facing the at least two stators 301, 302; 303, 304 for controlling the position, that is the levitation and/or the tilting 640A, 640B, of the mover 160 with respect to the at least one stator beam 130 may take place.

At 820, the at least two units of electromagnetic components 311, 311A, 311B, 312, 312A, 312B, 313, 314 may preferably be displaced in the direction defined by the stator beam 130 with respect to each other, and then in the method, the controlling of said magnitudes of air gaps 410A, 410B4 may comprise controlling the current of said units of electromagnetic components 311, 311A, 311B, 312, 312A, 312B, 313, 314 for controlling tilting of the mover 160 with respect to the stator beam 130.

At 899, the method execution is ended or stopped. The method flow may be executed once, intermittently, or preferably continuously in order to control the position, that is, the levitation and/or tilting of the mover 160 with respect to the stator beam 130.

Figure 9A:
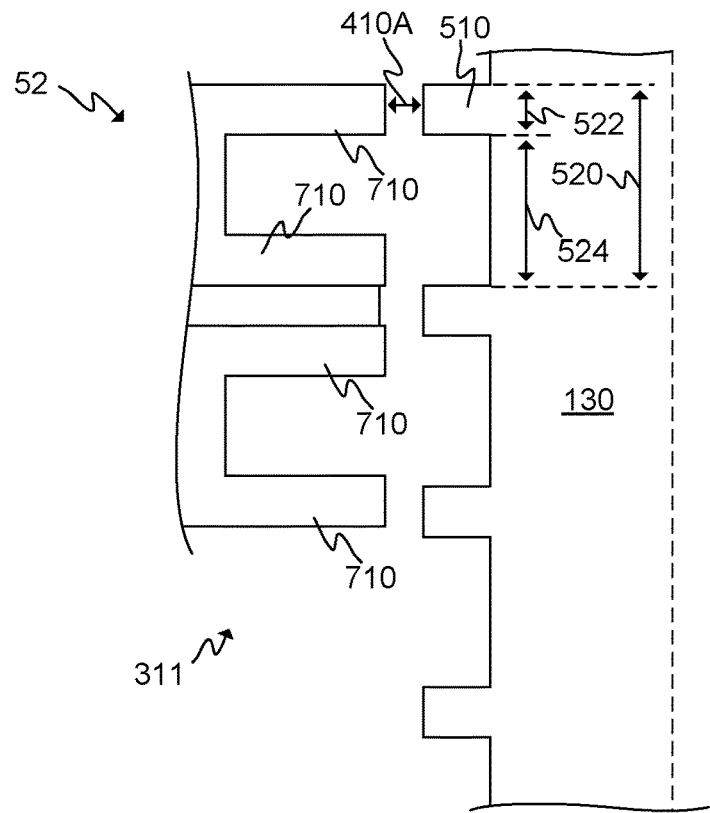
FIG. 9A illustrates schematically an electric linear motor according to an embodiment of the present invention.

FIG. 9A illustrates an embodiment of the present invention according to which the mover 160 of the electric linear motor 125 comprises independently controllable linear motor parts. Each of the parts such as these may be controlled by, for example, one electrical drive or converter, for example, so-called H-bridge inverter. Single independently controllable part as shown in FIG. 9A may comprise of two magnetic circuit parts, one magnetic pole and single coil. The magnetic circuit parts may be, for example, electrical steel such as silicon-iron (SiFe) or cobalt-iron (CoFe) alloys. The magnetic pole may be divided and orientation in various directions). The electrical linear motor comprising several independently controlled parts such as described herein have parts which may be magnetically in different phases, so that thrusting force production is smooth enough. A motor part can be design as a stepper motor, so that stator and rotor slot pitch is same. If the slot pitches are equal magnetic circuit reluctance is lower on the position of thrusting force is generated.

Figure 9B:
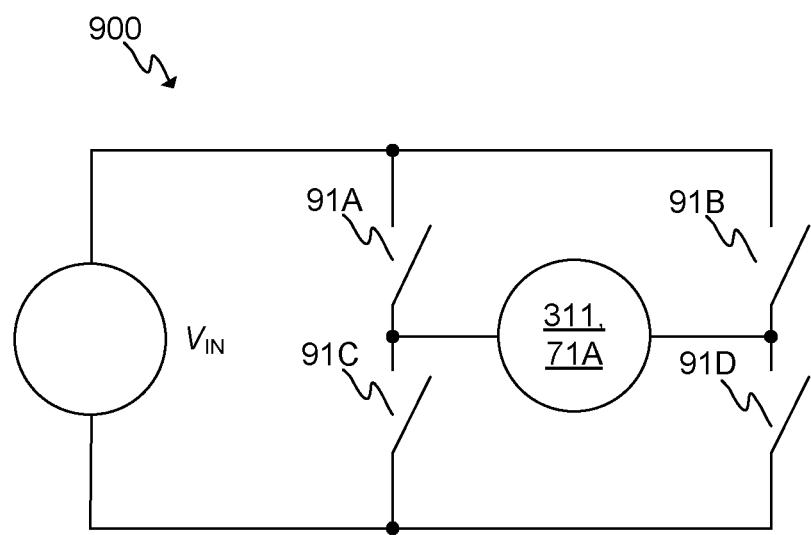
FIG. 9B illustrates schematically an electrical drive for operating the electrical motor according to an embodiment of the present invention.

By utilizing, for example, an H-bridge inverter as shown in FIG. 9B at 900, to control one independently controllable motor part fundamental winding factor of substantially 1 may advantageously be reached. Higher fundamental winding factor results higher flux linkage and thus higher thrust force per ampere ratio. As is known to a person skilled in the art, the H-bridge inverter 900 converts the DC (direct current) voltage $V_{IN}$, which may be voltage of the intermediate circuit of an frequency converter or any other DC source, to an AC voltage with respect to the load, in this case, an independently controllable motor part, such as, a unit 311, 311A, 311B, 312A, 312B or a subunit 71-73, 71A-73A, 71B-73B of the mover 160. The DC voltage may be connected to the part by utilizing the switches 91A-94A, such as semiconductor switches, e.g., insulated gate bipolar transistors or silicon carbide junction field effect transistors, such as to provide an input voltage with alternating polarity.

Another clear advantage of single controllable motor part is the possibility to feed any of harmonics, such as harmonics of divisible by three. Harmonics, which moves same direction as mover 160, can be utilized with H-bridge inverter. In case of linear motor end effects may create lot of harmonics, but on the other hand those can be utilized to produce thrusting force with this solution. In H-bridge inverter, the maximum voltage over one coil is same as DC-bus voltage of the inverter. In case of 3-phase, maximum voltage over phase is $1/\sqrt{3}$ of the dc-bus voltage. The solution of having independently controllable parts facilitates optimizing flux linkage which is challenging to achieve with a three-phase configuration.

Figure 10:
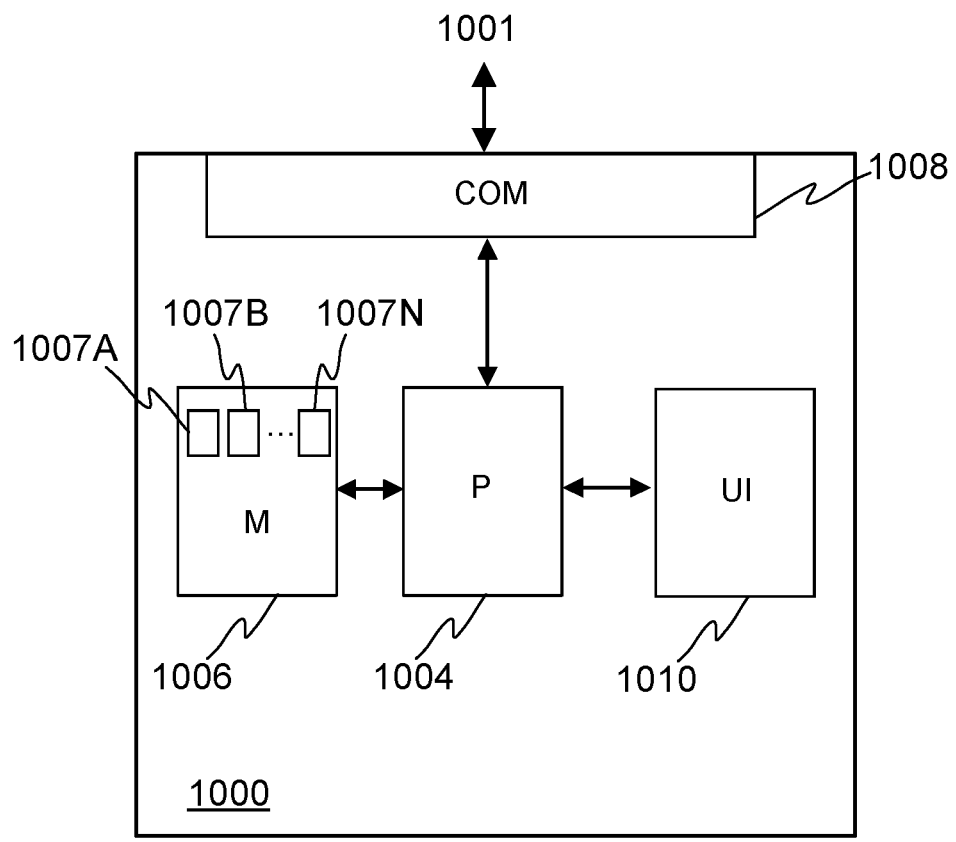
FIG. 10 illustrates schematically an elevator control unit according to an embodiment of the present invention.

FIG. 10 illustrates schematically an elevator control unit 1000 according to an embodiment of the present invention. External units 1001 may be connected to a communication interface 1008 of the elevator control unit 1100. External unit 1001 may comprise wireless connection or a connection by a wired manner. The communication interface 1008 provides interface for communication with external units 1001 such as the elevator car 110, the linear electric motor 125, the doors of the landing floors 120, or the electrical drive 105 or drives 105A, 105B to the elevator control unit 1000. There may also be connecting to the external system, such as a laptop or a handheld device. There may also be a connection to a database of the elevator 100 or an external database including information used in controlling the operation of the elevator 100.

The elevator control unit 1100 may comprise one or more processors 1004, one or more memories 1006 being volatile or non-volatile for storing portions of computer program code 1007A-1007N and any data values and possibly one or more user interface units 1010. The mentioned elements may be communicatively coupled to each other with e.g. an internal bus. The elevator control unit 1100 may be arranged on a single location or a part of the elevator, or its functionality may be implemented by elements in several locations, that is, in distributed manner, for example, having one element in the electrical drive 105 and other elements elsewhere in the elevator car 110 or the elevator 100. In case of distributed type of an elevator control unit 1100 appropriate connections must be established between the elements.

The processor 1004 of the elevator control unit 1000 may be at least configured to implement at least some method steps as described. The implementation of the method may be achieved by arranging the processor 1004 to execute at least some portion of computer program code 1007A-1007N stored in the memory 1006 causing the processor 1004, and thus the elevator control unit 1000, to implement one or more method steps as described. The processor 1004 is thus arranged to access the memory 1006 and retrieve and store any information therefrom and thereto. For sake of clarity, the processor 1004 herein refers to any unit suitable for processing information and control the operation of the elevator control unit 1000, among other tasks. The operations may also be implemented with a microcontroller solution with embedded software. Similarly, the memory 1006 is not limited to a certain type of memory only, but any memory type suitable for storing the described pieces of information may be applied in the context of the present invention.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An electric linear motor for an elevator, the electric linear motor comprising at least one stator beam and at least one mover, wherein said at least one stator beam comprises at least two stators on opposite sides of the stator beam, and the at least one mover is in electromagnetic engagement with said at least two stators and configured to be moved relative to said stator beam, wherein said at least one mover comprises:
   at least two units of electromagnetic components arranged on opposite sides of the stator beam to face said at least two stators for controlling the movement and the lateral position of the mover with respect to said stator beam; wherein each of the at least two units of electromagnetic components comprise at least two windings for generating magnetic fields
   wherein said at least two units of electromagnetic components arranged on the opposite sides of the stator beam are displaced with respect to each other in the direction defined by the stator beam for controlling tilting of the mover with respect to the stator beam.

2. The electric linear motor according to claim 1, wherein the at least two units of electromagnetic components are connected electrically in series or in parallel with respect to each other.

3. The electric linear motor according to claim 1, wherein each one of the at least two units of electromagnetic components are independently controllable by electrical drives.

4. The electric linear motor according to claim 3, wherein at least one of the at least two units of electromagnetic components is coupled to an H-bridge inverter.

5. The electric linear motor according to claim 1, wherein the motor comprises at least four units of electromagnetic components arranged such that two of the at least four units are arranged on opposite side of the stator beam with respect to other two of the at least four units to face said at least two stators for controlling the movement and the position of the mover with respect to said stator beam.

6. A method for controlling operation of an electric linear motor, wherein the electric linear motor comprises at least one stator beam and at least one mover, wherein said at least one stator beam comprises at least two stators on opposite sides of the stator beam, and the at least one mover is in electromagnetic engagement with said at least two stators and configured to be moved relative to said stator beam, wherein the method comprises
   determining a magnitude of air gap between the mover and the at least one stator beam, and
   controlling said magnitude of air gap by at least two units of electromagnetic components arranged on opposite sides of the stator beam to face the at least two stators so as to control lateral position of the mover with respect to the at least one stator beam.

7. The method according to claim 6, wherein the determining of the magnitude of air gap comprises determining magnitudes of air gaps between the mover and the at least one stator beam at least at two locations.

8. The method according to claim 7, wherein each one of said two locations are on opposite sides of the stator beam with respect to each other.

9. The method according to claim 6, wherein the magnitude or magnitudes of air gap or gaps are determined in a direction parallel relative to the direction in which the units of electromagnetic components and stators are facing each other.

10. The method according to claim 6, wherein said locations are displaced in the direction defined by the stator beam for determining tilting of the mover with respect to the at least one stator beam.

11. The method according to claim 6, wherein the controlling of the magnitude or magnitudes of said air gap or gaps is performed by controlling the current of said units of electromagnetic components.

12. The method according to claim 7, wherein the at least two units of electromagnetic components are displaced in the direction defined by the stator beam with respect to each other, and in the method the controlling of said magnitudes of air gaps comprises controlling the current of said units of electromagnetic components for controlling tilting of the mover with respect to the stator beam.

13. The method according to claim 6, wherein the electric linear motor is a three-phase electric motor, and the method comprises determining a direct component of motor current, and the controlling of the magnitudes of air gap or gaps comprises controlling the direct component of motor current for controlling the lateral position of the mover with respect to the stator beam.

14. The method according to claim 6, wherein the determining of the magnitude of air gap is performed by utilizing an inductive proximity sensor at at least two locations.

15. A computer program product for controlling operation of an electric linear motor comprising program instructions wherein when executed by an elevator control unit cause the elevator control unit to perform the method according to claim 6.

16. An elevator control unit for controlling operation of an electric linear motor of an elevator, the elevator control unit comprising:

at least one processor, and at least one memory storing at least one portion of computer program code, wherein the at least one processor being configured to cause the elevator control unit at least to perform:

determine a magnitude of air gap between a mover and the at least one stator beam, and control said magnitude of air gap by at least two units of electromagnetic components facing the at least two stators.

17. An elevator for controlling operation of an electric linear motor of the elevator, wherein the elevator comprises an electric linear motor, the electric linear motor comprising at least one stator beam and at least one mover, wherein said at least one stator beam comprises at least two stators on opposite sides of the stator beam, and the at least one mover is in electromagnetic engagement with said at least two stators and configured to be moved relative to said stator beam, determining means for determining magnitudes of air gaps on said opposite sides of the stator beam, and an elevator control unit, wherein the elevator control unit configured to at least to:

determine a magnitude of air gap between the mover and the at least one stator beam, and control said magnitude of air gap by at least two units of electromagnetic components facing the at least two stators, and wherein the elevator control unit, the determining means and the electric linear motor or an electrical drive operating the motor are communicatively coupled to each other.

18. The elevator according to claim 17, wherein said at least two units of electromagnetic components arranged on the opposite sides of the stator beam are displaced with respect to each other in the direction defined by the stator beam for controlling tilting of the mover with respect to the stator beam.

* * * * *